(12) United States Patent
Yamamoto et al.

(10) Patent No.: US 8,327,150 B2
(45) Date of Patent: Dec. 4, 2012

(54) SYSTEM, METHOD AND PROGRAM FOR MANAGING INFORMATION

(75) Inventors: Masaru Yamamoto, Sagamihara (JP); Kazutoshi Sugimoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 11/278,442

(22) Filed: Apr. 3, 2006

(65) Prior Publication Data

US 2006/0242088 A1    Oct. 26, 2006

(30) Foreign Application Priority Data

Apr. 21, 2005 (JP) ................. 2005-123532

(51) Int. Cl.
*G06F 21/00* (2006.01)
(52) U.S. Cl. ........................................ 713/178
(58) Field of Classification Search ............... 705/1, 50, 705/76; 713/178
See application file for complete search history.

(56) References Cited

U.S. PATENT DOCUMENTS

| 6,792,486 | B1 * | 9/2004 | Hanan et al. ........... 710/74 |
| 6,807,367 | B1 * | 10/2004 | Durlach ................. 386/221 |
| 2002/0171581 | A1 * | 11/2002 | Sheynblat et al. ...... 342/357.09 |
| 2003/0159048 | A1 * | 8/2003 | Matsumoto et al. ..... 713/178 |
| 2003/0212828 | A1 * | 11/2003 | Miyazaki et al. ....... 709/248 |
| 2004/0078334 | A1 * | 4/2004 | Malcolm et al. ........ 705/50 |
| 2005/0102499 | A1 * | 5/2005 | Kosuga et al. ......... 713/152 |
| 2005/0131924 | A1 * | 6/2005 | Jones .................. 707/100 |
| 2006/0100888 | A1 * | 5/2006 | Kim et al. ............. 705/1 |

FOREIGN PATENT DOCUMENTS

| JP | 2000276445 | 10/2000 |
| JP | 2002-125119 | 4/2002 |
| JP | 2002215825 | 8/2002 |
| JP | 2004-135024 | 4/2004 |
| JP | 2005018725 | 1/2005 |

* cited by examiner

*Primary Examiner* — Jeffrey Pwu
*Assistant Examiner* — Anthony Brown
(74) *Attorney, Agent, or Firm* — Brevetto Law Group

(57) ABSTRACT

To create signature data which certifies the time when information existed and add it to the information more efficiently than before. A time certification system for certifying the time when information existed, comprising: an identity certification data acquisition section for acquiring identity certification data generated based on the information to certify the identity of the information; a time certification data generation section for observing a target object changing with time elapse from the outside and generating time certification data based on observation data obtained as a result of the observation, in response to an instruction received from a user; a signature data generation section for generating signature data indicating that the information existed at the time when the target object was observed, based on combination of the identity certification data and the time certification data; and an information recording section for recording the signature data in association with the information.

20 Claims, 8 Drawing Sheets

Figure 5
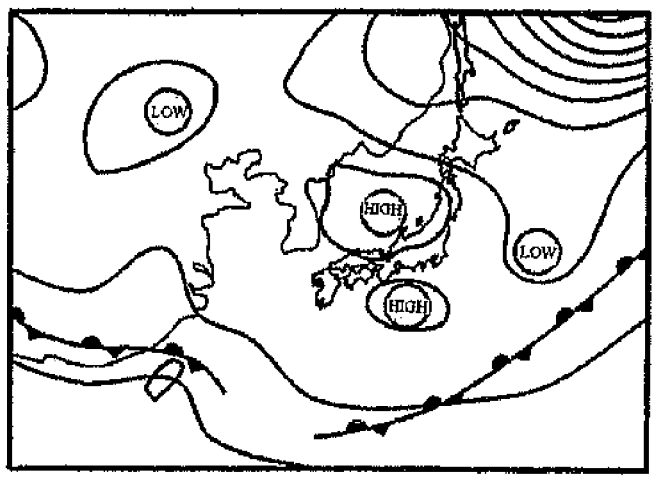
(a)
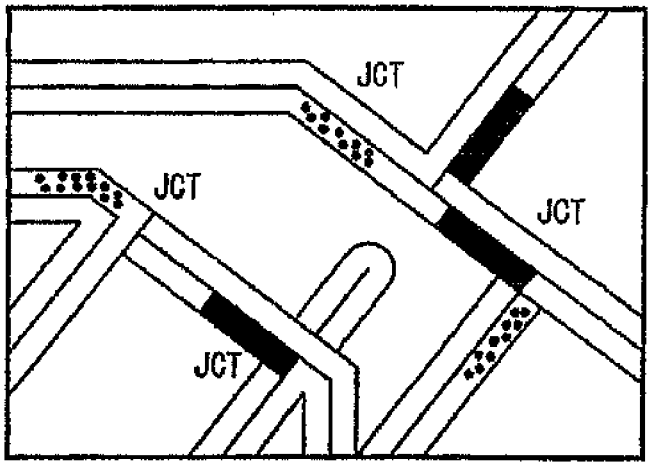
(b)
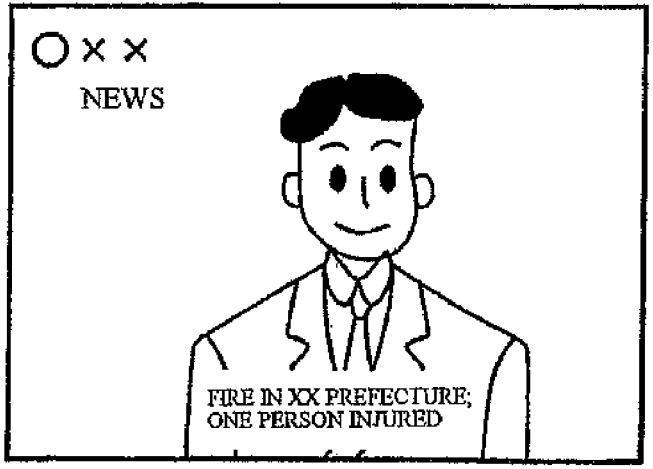
(c)

| OBSERVATION TIME | OBSERVATION DATA | |
|---|---|---|
| | FIRST TARGET OBJECT | SECOND TARGET OBJECT |
| ⋮<br>5/3 16:06<br>⋮<br>5/4 17:03<br>⋮ | ⋮<br>XX1.jpg<br>⋮<br>XX2.jpg<br>⋮ | ⋮<br>YY1.jpg<br>⋮<br>YY2.jpg<br>⋮ |

(2)

300

| OBSERVATION TIME | OBSERVATION DATA | |
|---|---|---|
| | FIRST TARGET OBJECT | SECOND TARGET OBJECT |
| ⋮<br>5/3 16:06<br>⋮<br>5/4 17:03<br>⋮ | ⋮<br>XX1.hash<br>⋮<br>XX2.hash<br>⋮ | ⋮<br>YY1.hash<br>⋮<br>YY2.hash<br>⋮ |

(3)

300

| OBSERVATION TIME | FIRST OBSERVATION DATA | SECOND OBSERVATION DATA | THIRD OBSERVATION DATA |
|---|---|---|---|
| ⋮<br>5/3 16:06<br>⋮<br>5/4 17:03<br>⋮ | ⋮<br>AA1.dat<br>⋮<br>BB1.dat<br>⋮ | ⋮<br>AA2.dat<br>⋮<br>BB2.dat<br>⋮ | ⋮<br>AA3.dat<br>⋮<br>BB3.dat<br>⋮ |

SYSTEM, METHOD AND PROGRAM FOR MANAGING INFORMATION

DETAILED DESCRIPTION OF THE INVENTION

1. Field of the invention

The present invention relates to a system, a method and a program for managing information. In particular, the present invention relates to a system, a method and a program for certifying the time when information existed.

2. Background Art

Recently, it has been suggested that hospital medical records on which information about diagnosis be recorded as electronic data. However, when important documents such as medical records are stored as electronic data, there is a problem that the content of the medical records can be easily modified by rewriting electronically without any traces. Furthermore, if electronic data is recognized as public documents due to the development of or changes in legal systems, it becomes more important to take measures to counter such untraceable modification.

To cope with this problem, a technique for adding a document to be stored as electronic data with an electronic signature which certifies the time when the document existed has been used (see Published Unexamined Patent Application No. 2004-135024). In this technique, an electronic signature by an authoritative institution is added to a document including the time when the document existed. Thereby, it is possible to certify that the document existed at that time by verifying the validity of the electronic signature.

As an another example, a technique has been proposed in which existence of a document at a particular time is certified by generating a random graphic by means of a random number generator with time as an argument, cutting off at least a part of the graphic and adding it to the document (see Published Unexamined Patent Application No. 2002-125119). According to this technique, it is possible to certify the time when a document existed if the random number generator can be appropriately protected from access from the outside.

However, in order to add an electronic signature of an authoritative institution to a document, it is necessary to communicate with a server or such as the authoritative institution via a network every time the electronic signature is to be added. Therefore, processing time is required to obtain the electronic signature, and the electronic signature cannot be obtained in an environment where communication with the server or such as the institution is impossible. Furthermore, a user may have to pay consideration based on the number of times of adding the electronic signature, and this is not suitable for the case where documents, such as medical documents, are frequently updated because the cost becomes extremely high.

If an apparatus for adding an electronic signature and an apparatus for creating a document are provided in the same organization, it is impossible to cope with wrongdoing by the organization itself. The same goes for the second technique described above. Resistance to tampering is low unless the random number generator is stored and operated in a closed secret storage such as a strong room (see Paragraph 25 of the second patent document, for example).

Accordingly, the object of the present invention is to provide a system, a method and a program capable of solving the problems described above.

SUMMARY OF THE INVENTION

To solve the above problems, in the present invention, there are provided a system for managing information, comprising: a first data acquisition section for acquiring first data generated based on the information to certify the identity of the information; a second data generation section for observing a target object changing with time elapse from the outside and generating second data based on observation data obtained as a result of the observation, in response to an instruction received from a first user; a signature data generation section for generating signature data indicating that the information existed at the time when the target object was observed, based on combination of the first data and the second data; and an information recording section for recording the signature data in association with the information; a method to be applied to the system; and a program for causing an information processor to function as the system.

According to the present invention, it is possible to create signature data which certifies the time when information existed and add it to the information more efficiently than before.

BRIEF DESCRIPTION OF THE DRAWINGS

FIG. 5 shows concrete examples of observation data to be acquired by the information management apparatus 20;

FIG. 8 shows concrete examples of observation data;

DETAILED DESCRIPTION

The present invention will be described below through an embodiment of the invention. The embodiment described below, however, does not limit the invention described in the Claims, and all the combinations of the characteristics described in the embodiment are not necessarily required.

Figure 1:
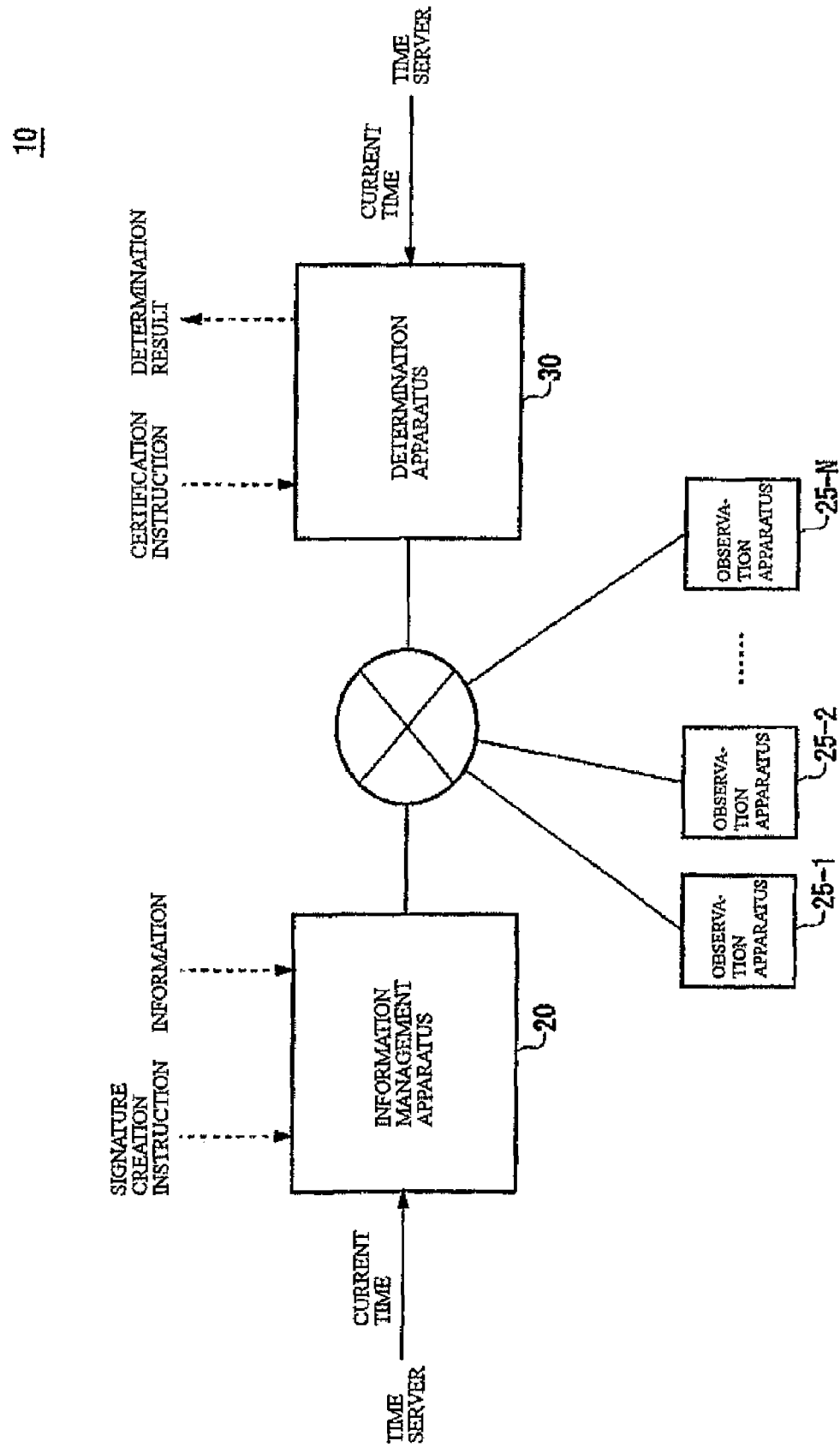
FIG. 1 shows the entire configuration of a time certification system 10.

FIG. 1 shows the entire configuration of a time certification system 10. The time certification system 10 is provided with an information management apparatus 20 to be provided for a first user, observation apparatuses 25-1 to 25-N and a determination apparatus 30 to be provided for a second user, and manages information inputted by the first user. The information management apparatus 20 acquires information such as a document, an image and a voice from outside the system. For example, every time a medical record is updated, the information management apparatus 20 acquires the medical record. Then, in response to certification instruction to create a signature, the information management apparatus 20 generates signature data indicating that the information existed at the time when it was acquired and records the signature data in association with the information. To generate the signature data, information about the current time acquired from an external time server and observation data obtained by observing a target object by means of at least any one of the observation apparatuses 25-1 to 25-N are used.

Each of the observation apparatuses 25-1 to 25-N observes a target object which changes as time elapses. For example, each of the observation apparatuses 25-1 to 25-N may be a web server for providing traffic jam information updated in real time or may be a server for a web camera which takes images of the sea, a river or a natural phenomenon such as a water fall flow with an imaging apparatus and providing the taken images. It is desirable that the respective observation apparatuses 25-1 to 25-N observe multiple different target objects.

The determination apparatus 30 sequentially acquires observation data obtained as a result of the respective observation apparatuses 25-1 to 25-N observing the target objects and records them in association with the times when the observations were made. The observation data to be recorded is not limited to data, such as image data, which is obtained directly from a target object. It may be data obtained by performing predetermined processings such as compression processing and hash generation processing for the image data. Then, in response to an instruction to the effect that the time when information recorded in the information management apparatus 20 existed should be certified, the determination apparatus 30 determines whether or not the information recorded in the information management apparatus 20 existed at the particular time and outputs the result of the determination.

The time certification system 10 according to this embodiment generates signature data indicating that information existed at a particular time without accessing the determination apparatus 30 strictly managed by an authoritative institution. The purpose is to reduce processing time, cost and the like even in the case of frequently generating the signature data. Furthermore, the time certification system 10 according to this embodiment uses data obtained by observing a natural phenomenon or the like, which changes as time changes, for creation of signature data. The purpose is to make it difficult for a malicious user to disguise the time when information existed.

Figure 2:
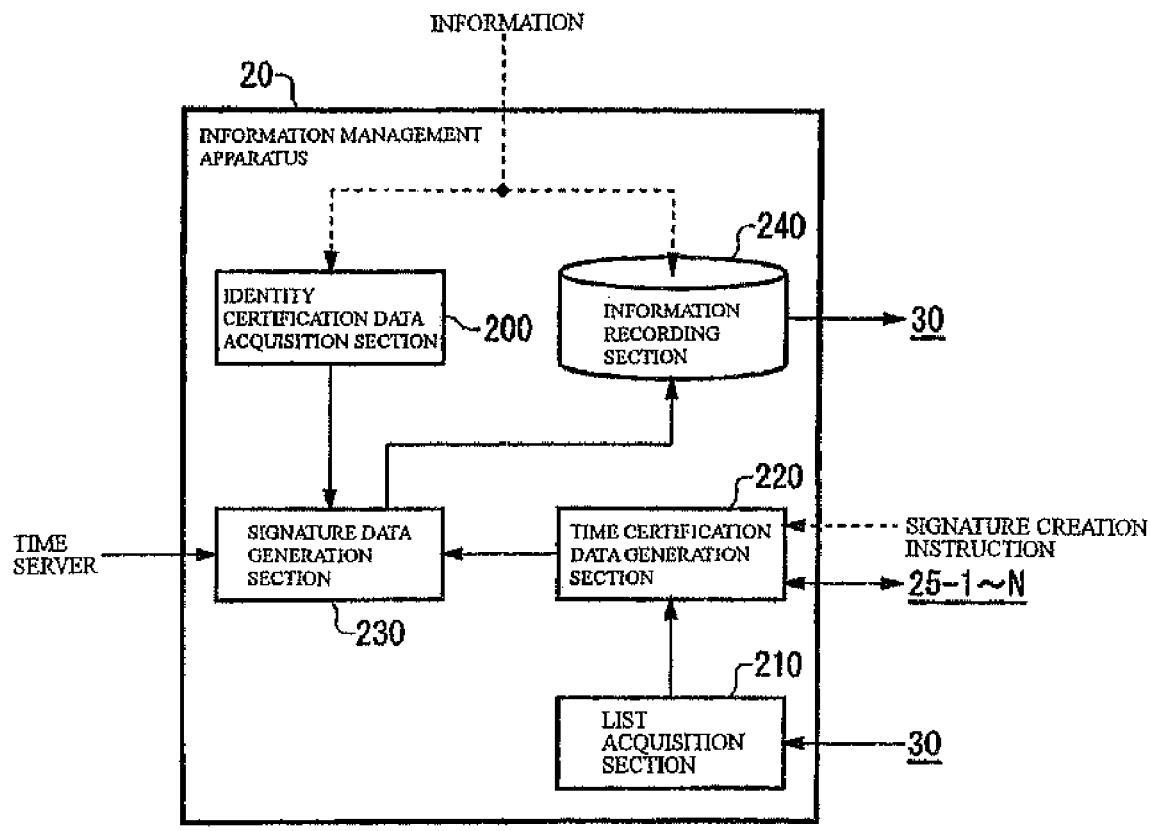
FIG. 2 shows the functions of an information management apparatus 20 classified in functional blocks.

FIG. 2 shows the functions of the information management apparatus 20 classified in functional blocks. The information management apparatus 20 has an identity certification data acquisition section 200, which is an example of a first data acquisition section, a list acquisition section 210, a time certification data generation section 220, which is an example of a second data acquisition section, a signature data generation section 230 and an information recording section 240. The identity certification data acquisition section 200 acquires information from the outside and acquires identity certification data generated based on the information to certify the identity of the information. The identity certification data is an example of first data according to the present invention. For example, the identity certification data acquisition section 200 may generate digest data from information acquired from the outside with a predetermined hash function and use the digest data as the identity certification data.

The list acquisition section 210 acquires a list of target objects in which multiple target objects changing with time elapse are specified in a predetermined order, from an existence determination section 320 of the determination apparatus 30. It is desirable to use secure communication by means of a cryptography determined with the determination apparatus 30 to acquire the list. Then, in response to a signature creation instruction received from the first user, the time certification data generation section 220 sequentially observes the multiple target objects specified in the list of target objects, and generates time certification data based on observation data obtained as a result of the observation. The time certification data is an example of second data according to the present invention. The time certification data generation section 220 may identify target objects using a list of target objects preset when the information management apparatus 20 was manufactured, instead of identifying target objects using the list of target objects acquired by the list acquisition section 210.

The signature data generation section 230 identifies the observation time when a target object was observed to acquire time certification data, based on the current time acquired from the time server. Then, the signature data generation section 230 generates signature data indicating that information existed at the time when the target object was observed, based on combination of the identity certification data and the time certification data, and the observation time. For example, the signature data generation section 230 may generate one signature datum by encrypting the observation time and the combination of the identity certification data and the time certification data with a cipher key. The generation of signature data stated here means, for example, data processing which makes it impossible for those other than a particular person, such as a cipher key holder, cannot acquire each of the identity certification data and the time certification data separately. Thereby, it is possible to make it extremely difficult for a malicious user to counterfeit the signature. The information recording section 240 records the generated signature data in association with the acquired information.

Figure 3:
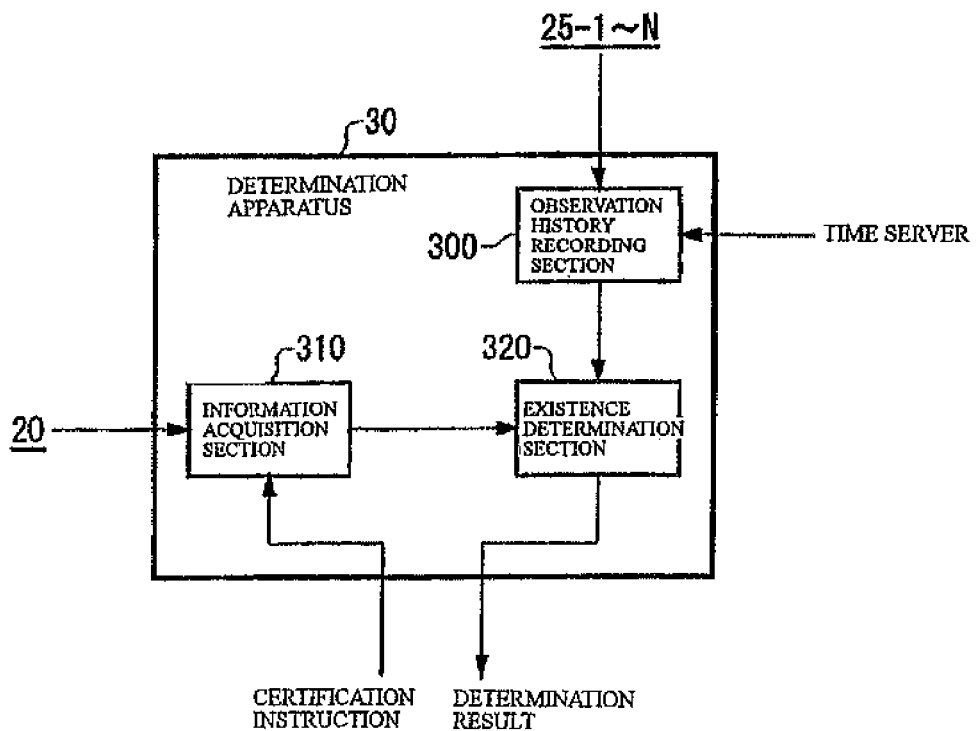
FIG. 3 shows the functions of a determination apparatus 30 classified in functional blocks.

FIG. 3 shows the functions of the determination apparatus 30 classified in functional blocks. The determination apparatus 30 has an observation history recording section 300, an information acquisition section 310 and the existence determination section 320. The observation history recording section 300 sequentially observes a target object as time elapses, and records observation data obtained as a result of the observation in association with the observation time. The information acquisition section 310 acquires information and signature data recorded in the information recording section 240, from the information management apparatus 20, in response to a certification instruction that the time when the information existed should be certified. The existence determination section 320 retrieves observation data corresponding to the time to be certified, from the observation history recording section 300. Then, the existence determination section 320 determines whether or not the information existed at the time, based on the retrieved observation data and the acquired information and signature data, and outputs the result of the determination.

Figure 4:
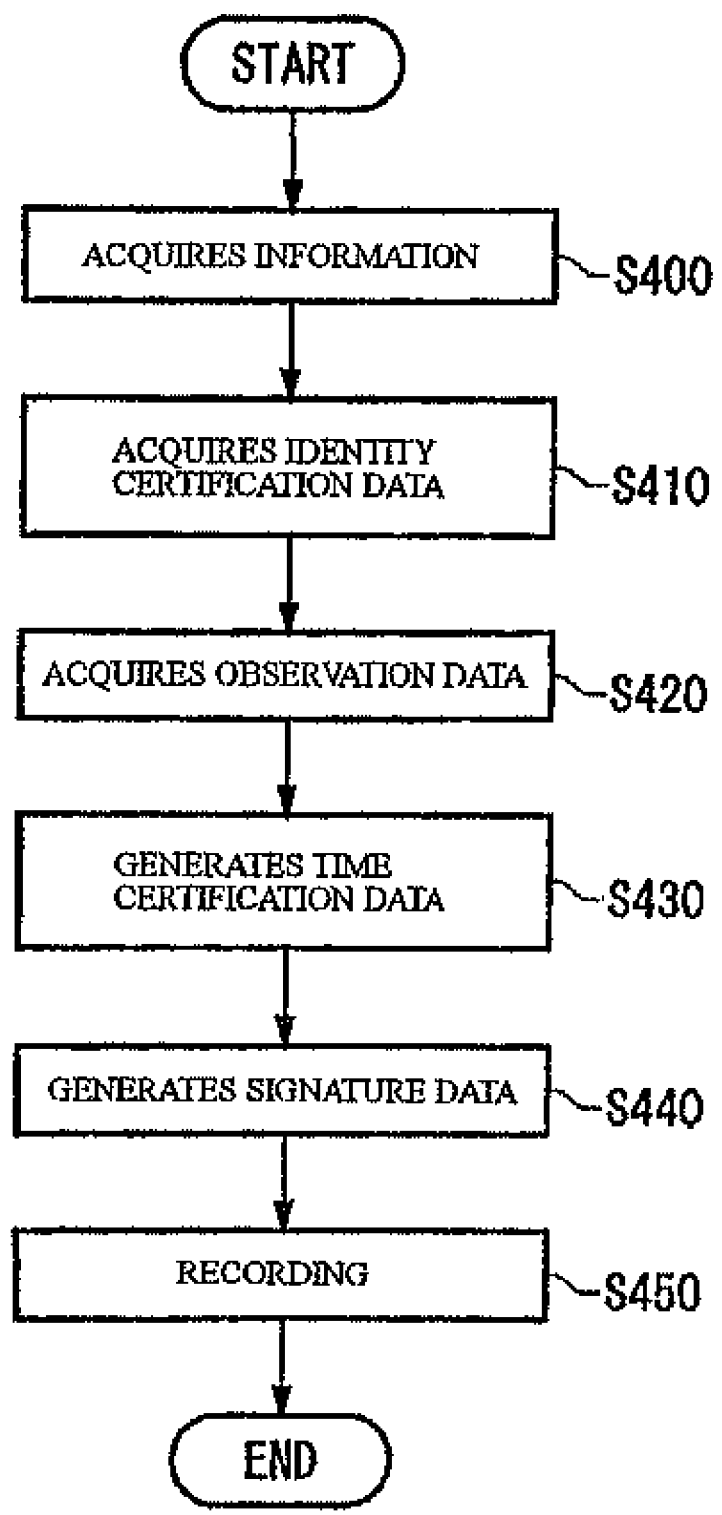
FIG. 4 shows a flowchart of a process of the information management apparatus 20 adding signature data to information and recording it.

FIG. 4 shows a flowchart of a process of the information management apparatus 20 adding signature data to information and recording it. The identity certification data acquisition section 200 acquires information to be added with signature data from the outside (S400). Then, the identity certification data acquisition section 200 acquires identity certification data generated based on the information to certify the identity of the information acquired from the outside (S410).

In response to an instruction received from a user, the time certification data generation section 220 acquires observation data by observing a target object from the outside (S420). Preferably, the time certification data generation section 220 observes a target object which changes with time elapse and without repeatability and generates time certification data based on observation data obtained as a result of the observation. Here, the change without repeatability is not limited to the case where there is no possibility that the form of the target object is identical to its form in the past but includes the case where the possibility is below a predetermined probability value which is too low for a user to perceive. It is desirable that the form of the target object is not uniquely determined by a function for which time is used as input. More specifically, the time certification data generation section 220 may observe a predetermined natural phenomenon (such as a water fall flow, sea waves and clouds in the sky). As an example of an observation method, the time certification data generation section 220 may acquire image data obtained by taking images of a target object changing with time elapse with the use of an imaging apparatus, as the observation data. Thus, it is possible to make the possibility extremely low that observation data at a particular point of time becomes equal to observation data at another point of time.

Instead, the time certification data generation section 220 may acquire information obtained by extracting characteristics of a target object under a constant rule, such as a weather map. As an another example, the time certification data generation section 220 may observe a broadcast signal obtained by receiving predetermined wired or wireless broadcast with a receiver. For example, this broadcast signal indicates data such as characters, voice and animation delivered by a broadcaster. Thus, by using information that is already publicly provided by an authoritative institution, it is possible not only to reduce the cost of introducing the time certification system 10 but also to enhance reliability of a signature. More preferably, the time certification data generation section 220 acquires data from each of the observation apparatuses 25-1 to 25-N through secure communication subject to success of mutual authentication with each of the observation apparatuses 25-1 to 25-N. The mutual authentication and the secure communication can be realized by communication in conformity with SSL (Secure Socket Layer), for example. Thus, it is possible to prevent spoofing of a target object to be observed and leakage of observation data.

Next, in response to an instruction received from the first user, the time certification data generation section 220 observes each target object changing with time elapse, from each of the external observation apparatuses 25-1 to 25-N, and generates time certification data based on observation data obtained as a result of the observation (S430). For example, the time certification data generation section 220 generates hash data from the observation data with a predetermined hash function and uses the hash data as the time certification data. Preferably, the time certification data generation section 220 acquires multiple observation data by observing multiple target objects, and then extracts data from each of the observation data by an extraction method predetermined for each target object to use the data as extracted data. Here, it is more preferable that a first extraction method corresponding to a first target object among the multiple target objects and a second extraction method corresponding to a second target object are different from each other. Then, the time certification data generation section 220 generates time certification data by combining the multiple extracted data by a predetermined combination method. Thus, it is possible to obtain time certification data with a high reliability and a low repeatability by utilizing the characteristics of each target object.

Instead, if the list acquisition section 210 has acquired a list of target objects, the time certification data generation section 220 may sequentially observe the multiple target objects included in the list of target objects in a predetermined order, and, subject to acquisition of observation data from any target object, generate time certification data based on the observation data. Thus, it is possible to make it easy to generate signature data even when a trouble has occurred in a network or a web server.

The signature data generation section 230 generates signature data indicating that the information existed at the time when the target object was observed, based on combination of the identity certification data and the time certification data (S440). For example, the signature data generation section 230 may generate the signature data by encrypting the combination of the identity certification data and the time certification data with an encryption key which can be decrypted by the existence determination section 320. Preferably, the encryption key is a public key of a public key infrastructure. In addition to the identity certification data and the time certification data, the signature data generation section 230 may include the observation time when the target object was observed to generate the time certification data, to generate the signature data. In this case, it is desirable that the clocks provided for the information management apparatus 20 and the determination apparatus 30 to acquire the observation time are synchronized with each other to show the same time, through communication in conformity with NTP (Network Time Protocol).

Then, the information recording section 240 records the generated signature data in association with the acquired information (S450). The information recording section 240 encrypts the information with an encryption key which can be decrypted by the determination apparatus 30 and records it. Thus, it is possible to appropriately cope with not only tamper but also discard of information.

FIG. 5 shows concrete examples of observation data to be acquired by the information management apparatus 20. FIG. 5(*a*) shows a weather map which is an example of the observation data. The weather map is, for example, image data on which geographical information of a region to be observed is displayed with isobars, the warm front, the cold front and the like overlapped thereon. The weather map data is created based on data such as barometric pressures and such like actually measured in respective regions, so that it is extremely rare that multiple weather map data at different points of time are exactly the same. Therefore, by generating time certification data based on such weather map data, it is possible to make it extremely difficult to counterfeit the time certification data at that point of time afterward.

FIG. 5(*b*) shows traffic jam information data which is an example of the observation data. The traffic jam information data is, for example, image data on which a route map of a route to be observed is displayed with an image indicating the degree of a traffic jam overlapped thereon. The traffic jam data is created based on the number of vehicles and such like actually measured at each survey point, so that it is extremely rare that multiple traffic jam data at different points of time are exactly the same. Therefore, by generating time certification data based on such traffic jam data, it is possible to make it extremely difficult to counterfeit the time certification data at that point of time afterward.

It is desirable that the content of these illustrated target objects is updated every time a predetermined length of time, from dozens of seconds to several minutes, has elapsed. That is, it is desirable that, even if weather map data is updated at an interval of one second in the observation apparatus 25-1, for example, the weather map data sent to the information management apparatus 20 or the determination apparatus 30 is updated every time the predetermined length of time described above has elapsed. Thus, it is possible to appropriately certify time even when the clocks provided for the information management apparatus 20 and the determination apparatus 30 are not synchronized.

FIG. 5(c) shows a broadcast signal which is an example of the observation data. A broadcast signal indicates, for example, an image to be displayed on a receiver installed in each home. As broadcast is digitalized recently, a broadcast signal is often delivered as digital data. Therefore, broadcast at the same point of time is almost the same no matter where it is received. By generating time certification data based on such a broadcast signal, it is possible not only to make it difficult to counterfeit the time certification data but also to enhance reliability of the time certification data.

In addition to these examples, the observation data may be data sent from various kinds of server connected to a network such as the Internet. For example, the observation data may be web page data sent from a web server, file data sent from an FTP server or mail data sent from a mail server. Such data may include various data such as a static image and a graphic, in addition to characters, voice or animation. That is, the time certification data generation section 220 may observe data sent from a server apparatus connected to a communication network and generate time certification data based on observation data obtained as a result of the observation.

Figure 6:
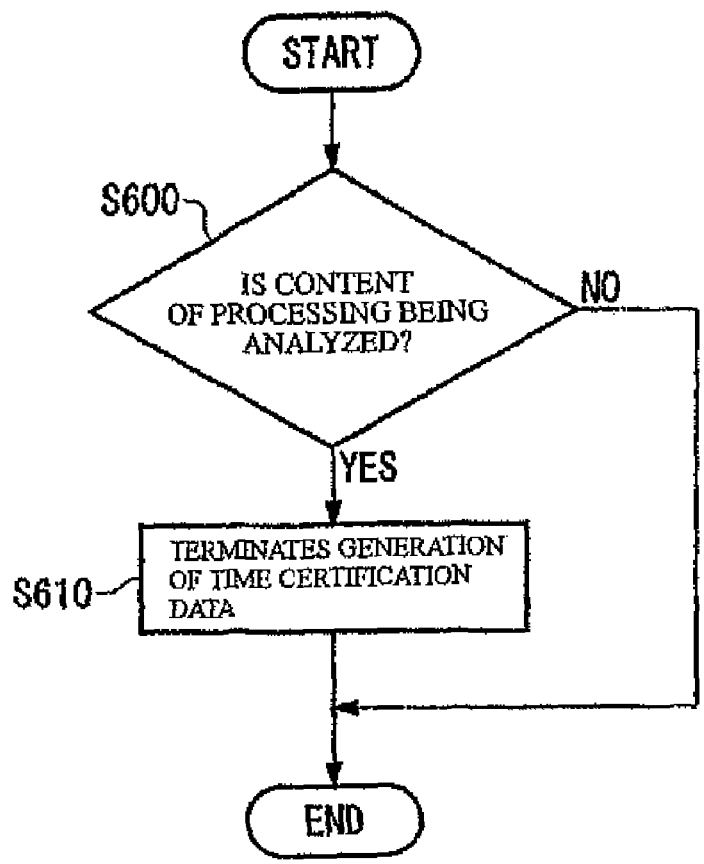
FIG. 6 shows a flowchart of a process of the information management apparatus 20 determining termination of generation of time certification data.

FIG. 6 shows a flowchart of a process of the information management apparatus 20 determining termination of generation of time certification data. The time certification data generation section 220 preferably determines, during processing of acquiring observation data and generating time certification data, whether or not the content of the processing is being analyzed, for example, periodically (S600). More specifically, if a debugger process is attached to a process thread for realizing the processing of generating time certification data on the OS, then the time certification data generation section 220 may determine that the content of the processing is being analyzed. Furthermore, if a program code for executing the processing is being executed at an extremely low speed below a predetermined reference speed, then the time certification data generation section 220 may determine that a tracing program for analyzing the content of the processing is being executed. Then, if the content of the processing is being analyzed (S610: YES), then the time certification data generation section 220 terminates the generation of time certification data (S620).

In addition, it is desirable that a program code for realizing the time certification data generation section 220 is encrypted and recorded on a recording medium of the information management apparatus 20. A technique for encrypting an executable program code can be realized, for example, by a technique of TrustedJVM developed by the applicant et al. or the like. Since there is no information to the effect that this encryption has been maliciously decrypted when this specification is applied, it can be believed that the content of the processing by the time certification data generation section 220 can be secret from users. These comprehensive measures make it possible to keep target objects to be observed secret from users.

Figure 7:
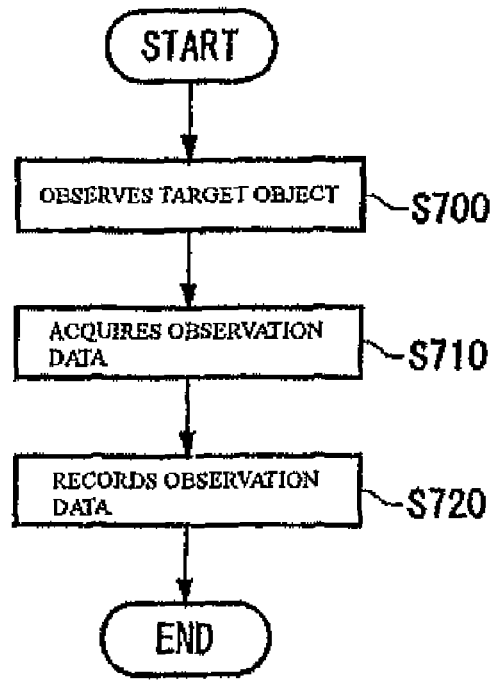
FIG. 7 shows a flowchart of a process of the determination apparatus 30 recording observation data.

FIG. 7 shows a flowchart of a process of the determination apparatus 30 recording observation data. The determination apparatus 30 sequentially performs the following processings, for example, as time elapses. First, the observation history recording section 300 observes target objects with the use of the observation apparatuses 25-1 to 25-N (S700). Then, the observation history recording section 300 acquires observation data obtained as a result of observing the target objects (S710). Then, the observation history recording section 300 records the observation data in association with the observation time (S720).

Here, the observation data may be any observation data obtained as a result of observing target objects. It is not limited to data obtained directly from the target objects but may be data obtained by performing a predetermined processing for the data. The following are concrete examples of the observation data.

FIG. 8 shows concrete examples of the observation data.

(1) Data Obtained Directly from Target Objects

The observation data may be, for example, image data of a weather map, image data obtained by taking images with an imaging apparatus or image data obtained by schematizing traffic jam information. For example, in this figure, the observation history recording section 300 records, in association with the observation time, image data acquired from respective target objects at the time as jpeg files. To obtain signature data from these image data, it is necessary to first obtain time certification data by applying a hash function to these image data. That is, in the case of this example, it is possible to prevent time certification from being counterfeited if the content of operation of the hash function is leaked, even when the observation data is stolen by a malicious user.

(2) Hash Data of Data Obtained Directly from Target Objects

The observation data may be, for example, hash data obtained by applying a hash function to the image data or the like obtained directly from target objects as illustrated in (1) above. For example, in this figure, the observation history recording section 300 generates hash data from image data at an observation time and records the hash data as files with an extension of .hash in association with the observation time. Since the size of hash data is relatively small in comparison with data obtained directly from a target object, the capacity required from the observation history recording section 300 can be reduced.

(3) Combination of Data Obtained from Multiple Target Objects

The observation data may be, for example, data obtained by generating the hash data illustrated in (2) above for each observation target object and combining the hash data. That is, in this case, the observation history recording section 300 acquires observation data by combining multiple hash data obtained from multiple target objects by a predetermined combination method. For example, in this figure, the observation history recording section 300 records observation data as files with an extension of .dat. In this case, the capacity required from the observation history recording section 300 can be reduced similarly to the case of (2) above.

The network configuration between the information management apparatus 20 and the observation apparatuses 25-1 to 25-N and the network configuration between the determination apparatus 30 and the observation apparatuses 25-1 to 25-N are often different from each other. For example, there may be a case where the determination apparatus 30 is connected to a backbone network, while the information management apparatus 20 is connected to a router provided for a terminal network through dial-up connection. Therefore, there may be a case where, at a particular time, all the data observed at that time can be obtained by the determination apparatus 30, while only the data observed before the time can be obtained by the information management apparatus 20 due to communication delay and the like.

In order to cope with such a situation, the observation history recording section 300 preferably generates multiple observation data at a particular time as described below.

Figure 9:
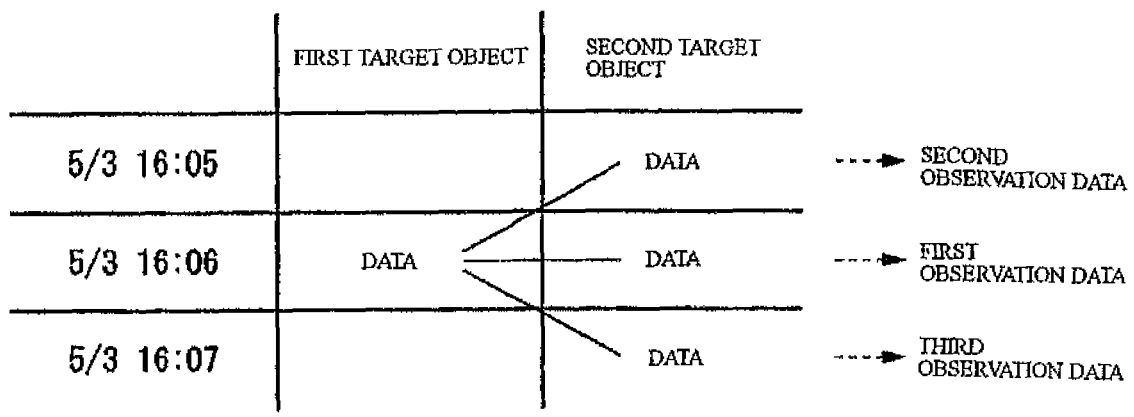
FIG. 9 is a conceptual diagram of a process of the observation history recording section 300 generating multiple observation data.

FIG. 9 is a conceptual diagram of a process of the observation history recording section 300 generating multiple observation data. First, the observation history recording section 300 obtains first observation data by combining hash data obtained from a first target object at a particular time with hash data obtained from a second target object at that time. Furthermore, the observation history recording section 300 obtains second observation data by combining hash data obtained from the first target object at the particular time with hash data obtained from the second target object at a time earlier than the time by a predetermined time period (for example, one minute). Furthermore, the observation history recording section 300 obtains third observation data by combining hash data obtained from the first target object at the particular time with hash data obtained from the second target object at a time later than the time by a predetermined time period time (for example, one minute). Then, the observation history recording section 300 records these observation data in association with the observation time when the first target object was observed.

Figure 10:
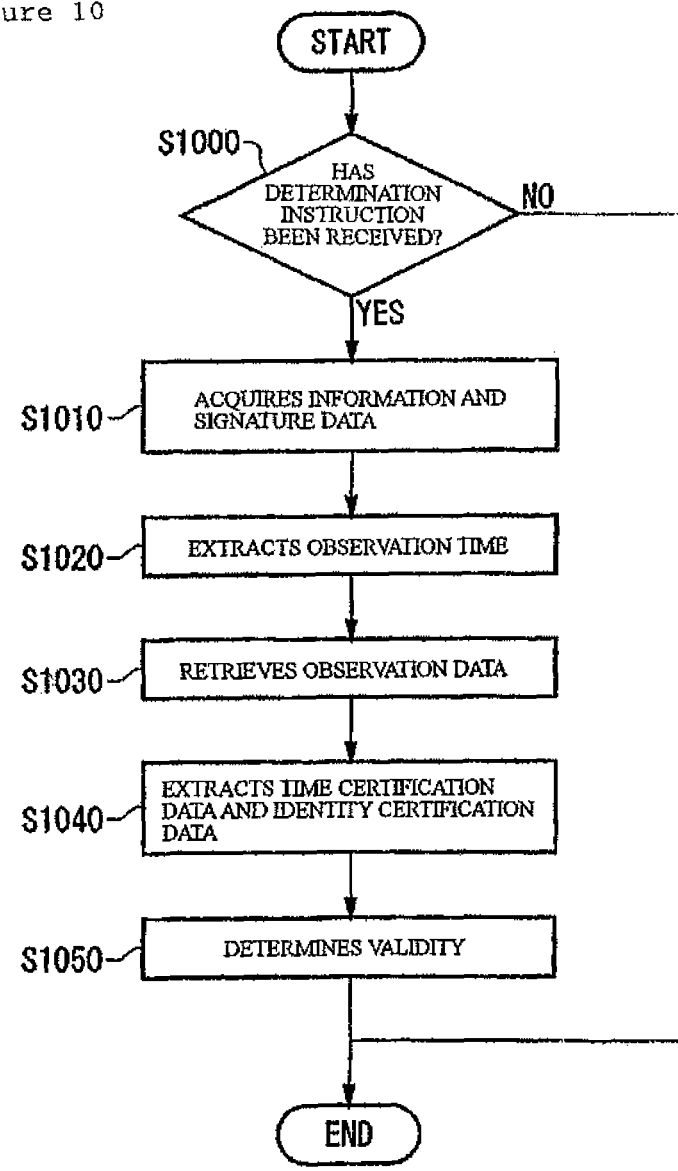
FIG. 10 shows a flowchart of a process of the determination apparatus 30 determining the validity of signature data.

Next, a flowchart of a process of the determination apparatus 30 determining validity of signature data for each of the cases of (1) to (3) described above, with the use of FIG. 10.
For the Case of (1) or (2)

In response to an instruction received from the second user to the effect that the time when information existed should be certified (S1000: YES), the information acquisition section 310 acquires the information and signature data recorded in the information recording section 240 from the information management apparatus 20 (S1010). By decrypting the signature data with a private key of a public key cryptosystem, the existence determination section 320 extracts target object observation time included in the signature data and recorded (S1020).

Then, the existence determination section 320 retrieves observation data corresponding to the extracted observation time from the observation history recording section 300 (S1030). The observation data stated here is data itself such as image data of a weather map in the case of (1) above, and hash data obtained by applying a hash function to the data in advance in the case of (2) above. In the case of multiple observation target objects, the existence determination section 320 acquires each of observation data corresponding to each of the observation target objects. Next, by decrypting the signature data, the existence determination section 320 extracts time certification and identity certification data (S1040). Then, the existence determination section 320 determines whether or not the information existed at the observation time based on the time certification data, the identity certification data, the information itself and the retrieved observation data (S1050).

In the case of the example of (1), the existence determination section 320 generates hash data by applying a hash function to the retrieved observation data and generates time certification data by combining the hash data generated for multiple target objects by a predetermined combination method.

In the case of the example of (2), since the retrieved observation data is hash data, the existence determination section 320 generates time certification data by combining the hash data for multiple target objects by a predetermined combination method.

Then, the existence determination section 320 determines whether or not the generated time certification data corresponds to extracted time certification data. If they correspond to each other, then the existence determination section 320 further generates identity certification data of the information from the information itself and determines whether or not it corresponds to extracted identity certification data. If they correspond to each other, then the existence determination section 320 determines that information existed at the observation time.

Instead, if multiple target objects are specified in the list of target objects, the existence determination section 320 may perform determination from identify certification data based on any observation data. Specifically, if the existence determination section 320 determines, based on observation data of any target object specified in the list of target objects, that information existed at the time when the observation data was observed, it may determine that the information existed at the observation time. Thus, even for signature data generated when a trouble has occurred in a network or a web server, the validity thereof can be appropriately determined.

Instead of the example in this figure, the existence determination section 320 may not extract the time of observation of target objects. In this case, the existence determination section 320 may sequentially determine, for each of the observation data recorded in the observation history recording section 300, whether or not time certification data generated from the observation data corresponds to time certification data in signature data. Such processing also makes it possible to appropriately determine the validity of the signature data though more processing time is required in comparison with the processing using the observation time.
For the Case of (3)

In response to an instruction to the effect that the time when information existed should be certified (S1000: YES), the information acquisition section 310 acquires the information and signature data recorded in the information recording section 240 from the information management apparatus 20 (S1010). By decrypting the signature data with a private key of a public key cryptosystem, the existence determination section 320 extracts the time of observation of target objects included and recorded in the signature data (S1020).

Then, the existence determination section 320 retrieves multiple observation data corresponding to the extracted observation time from the observation history recording section 300 (S1030). The observation data stated here is data generated by taking out hash data from data obtained from multiple target objects and then combining these hash data by a predetermined method. That is, in this case, time certification data and the observation data are the same.

Next, by decrypting the signature data, the existence determination section 320 extracts time certification data and identity certification data (S1040). Then, the existence determination section 320 determines whether or not the information existed at the observation time based on the time certification data, the identity certification data, the information itself and the retrieved observation data (S1050).

Specifically, the existence determination section 320 determines, for each of the retrieved multiple observation data, whether or not the observation data corresponds to the extracted time certification data. If any observation data corresponds to the time certification data, then the existence determination section 320 further generates identity certification data of the information from the information itself and determines whether or not the identity certification data corresponds to the extracted identity certification data. If they correspond to each other, then the existence determination section 320 determines that the information existed at the observation time.

Thus, by recording multiple observation data in association with the same observation time, time certification can be correctly authenticated even when multiple objects cannot be observed simultaneously at the observation time.

Figure 11:
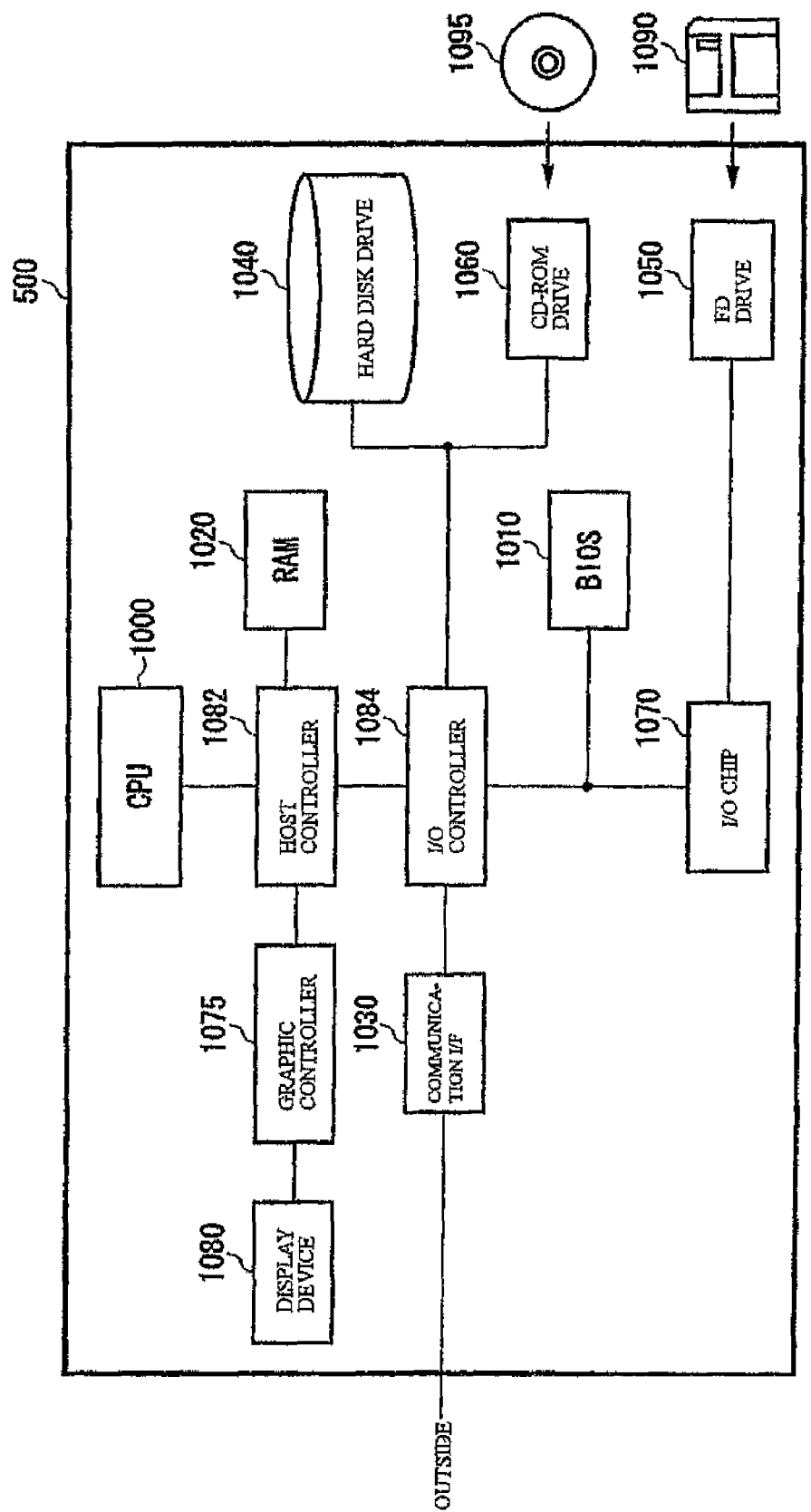
FIG. 11 shows an example of hardware configuration of an information processor 500 which functions as the information management apparatus 20 or the determination apparatus 30.

FIG. 11 shows an example of hardware configuration of an information processor 500 which functions as the information management apparatus 20 or the determination apparatus 30 in this embodiment or a variation embodiment. The information processor 500 is provided with a CPU peripheral part having a CPU 1000, a RAM 1020 and a graphic controller 1075 mutually connected via a host controller 1082; an input/output part having a communication interface 1030, a hard disk drive 1040 and a CD-ROM drive 1060 which are connected to the host controller 1082 via an input/output controller 1084; and a legacy input/output part having a ROM 1010, a flexible disk drive 1050 and an input/output chip 1070 which are connected to the input/output controller 1084.

The host controller 1082 connects the RAM 1020 with the CPU 1000 and the graphic controller 1075 which access the RAM 1020 at a high transfer rate. The CPU 1000 operates based on programs stored in the ROM 1010 and RAM 1020 to control each part. The graphic controller 1075 acquires image data generated on a frame buffer provided in the RAM 1020 by the CPU 1000 or the like, and displays it on a display device 1080. Alternatively, the graphic controller 1075 may include therein a frame buffer for storing image data generated by the CPU 1000 and the like.

The input/output controller 1084 connects the host controller 1082 with the communication interface 1030, the hard disk drive 1040 and the CD-ROM drive 1060 which are relatively high speed input/output devices. The communication interface 1030 communicates with external apparatuses via a network. The hard disk drive 1040 stores programs and data to be used by the information processor 500. The CD-ROM drive 1060 reads a program or data from a CD-ROM 1095 and provides it to the RAM 1020 or the hard disk drive 1040.

The ROM 1010 and relatively low speed input/output devices, such as the flexible disk drive 1050 and the input/output chip 1070, are connected to the input/output controller 1084. In the ROM 1010, there are stored a boot program to be executed by the CPU 1000 when the information processor 500 is activated, and programs dependent on the hardware of the information processor 500. The flexible disk drive 1050 reads a program or data from a flexible disk 1090 and provides it to the RAM 1020 or the hard disk drive 1040 via the input/output chip 1070. The input/output chip 1070 connects the flexible disk 1090, or various input/output devices, for example, via a parallel port, a serial port, a keyboard port, a mouse port or the like.

A program to be provided for the information processor 500 is stored in a recording medium such as the flexible disk 1090, the CD-ROM 1095 and an IC card, and provided by a user. The program is read from the recording medium via the input/output chip 1070 and/or the input/output controller 1084, installed in the information processor 500 and executed. The operations which the program causes the information processor 500 and the like to perform are the same as the operations performed in the information management apparatus 20 or the determination apparatus 30, which have been described with reference to FIGS. 1 to 10, and therefore, description thereof will be omitted.

The program described above may be stored in an external recording medium. As the recording medium, an optical recording medium such as a DVD and a PD, a magneto-optic recording medium such as an MD, a tape medium, and a semiconductor memory such as an IC card may be used in addition to the flexible disk 1090 and the CD-ROM 1095. It is also possible to use a storage device such as a hard disk and a RAM provided in a server system connected to a dedicated communication network or the Internet to provide the program to the information processor 500 via the network.

As described above, with the use of the time certification system 10 according to this embodiment, it is possible to generate signature data indicating that information existed at a particular time without accessing an apparatus strictly managed by an authoritative institution. Thus, in the case where it is necessary to frequently generate signature data but frequency of determining the validity thereof is low, processing time, cost and the like can be significantly reduced. With the use of the time certification system 10 according to this embodiment, observation data obtained by observing a natural phenomenon or the like which changes with time elapse is used for creation of signature data. Thus, it is possible to make it difficult for a malicious user to counterfeit the time when information existed.

The present invention has been described with the use of an embodiment. However, the technical scope of the present invention is not limited to the range described in the embodiment. It is apparent to those skilled in the art that various modifications or improvements can be made to the embodiment described above. It is apparent from the description of the Claims that such modified or improved embodiments can be included in the technical scope of the present invention.

We claim:

1. A method implemented on a computer for providing a time certification signature certifying that a set of information existed at an observation time, the method comprising:
   acquiring the set of information to be certified;
   acquiring identity data configured to identify the set of information;
   receiving at said computer first observation data associated with the observation time, the first observation data being sent to said computer from a first external server via Internet;
   receiving second observation data sent to said computer, the second observation data being sent from a second external server via the Internet to said computer;
   using the first observation data and the second observation data to generate time certification data for said observation time;
   generating, by the computer, the time certification signature for said observation time by encrypting with an encryption key the observation time, the identity data and the time certification data, wherein the encryption key is configured for use in decrypting the time certification signature for determination of the observation time; and
   attaching the time certification signature to the set of information to certify that the set of information existed at said observation time;
   wherein the first observation data is generated for said observation time from observation of either measurements or image data for a target object that changes without repeatability as time elapses.

2. The method of claim 1, wherein the encryption key is a public key, and wherein the generating of the time certification data further comprises:
   generating hash data from the first observation data using a predetermined first hash function, and using said hash data as the time certification data for said observation time;
   wherein said target object is not characterized by a function for which time is an input.

3. The method of claim 1, further comprising:
  storing the time certification signature with the set of information on the computer.

4. The method of claim 1, wherein the acquiring of the set of information comprises generating the set of information; and
  wherein the identity data comprises digest data generated from the set of information to identify the set of information.

5. The method of claim 1, wherein said server is a web server that obtains said first observation data by applying a second hash function to the image data of the target object; and
  wherein said target object is selected from a group consisting of a natural waterflow, a broadcast signal, traffic patterns, cloud patterns, and weather observations.

6. The method of claim 5, wherein the first observation data is sent to said computer from the first external server via a first connection to the Internet, the method further comprising:
  detecting at a certification means an instruction from a user to certify that the set of information existed at said observation time, the certification means being connected to said computer by the Internet;
  wherein the generating of said time certification data is performed in response to said instruction from the user by the certification means which comprises an observation history recording section for storing the first observation data from the first external server via a second connection the Internet.

7. A computer system configured to provide a time certification signature certifying that a set of information existed at an observation time, the system comprising:
  a memory configured to store the set of information to be certified and identity data for identifying the set of information;
  a communication interface configured to receive first observation data associated with the observation time, the first observation data being sent to said computer system from a first external server via Internet, said communication interface being further configured to receive second observation data sent via the Internet to said computer from a second external server;
  a processor configured to execute instructions for generating time certification data from the first and second observation data for said observation time, for generating the time certification signature for said observation time by encrypting with an encryption key the observation time, the identity data and the time certification data, wherein the encryption key is configured for use in decrypting the time certification signature for determination of the observation time, said processor be further configured to attach the time certification signature to the set of information to certify that the set of information existed at said observation time;
  wherein the first observation data is generated for said observation time from observation of either measurements or image data for a target object that changes as time elapses;
  wherein said first observation data is based on the image data of the target object which changes without repeatability.

8. The computer system of claim 7, wherein the encryption key is a public key, wherein the processor is configured to execute further instructions for generating hash data from the first observation data using a predetermined first hash function, and for using said hash data as the time certification data for said observation time, and wherein said target object is not characterized by a function for which time is an input.

9. The computer system of claim 7, wherein the communication interface is configured to connect to the Internet.

10. The computer system of claim 7, wherein the identity data comprises digest data generated from the set of information to identify the set of information.

11. The computer system of claim 7, wherein said server is a web server that obtains said first observation data by applying a second hash function to image data of the target object; and
  wherein said target object is selected from a group consisting of a natural waterflow, a broadcast signal, traffic patterns, cloud patterns, and weather observations.

12. The computer system of claim 11, wherein the time certification signature is configured to be validated by a certification means, the system further comprising:
  the certification means being configured to receive an instruction from a user to certify existence of the set of information existed at said observation time, wherein the certification means generates a copy of said time certification data in response to said instruction from the user from a copy of the first observation data stored in an observation history recording section of the certification means.

13. The method of claim 1, wherein said target object is one of a plurality of target objects used in generating the first observation data, said plurality of target objects including a first target object and a second target object which are different from each other.

14. The computer system of claim 7, wherein said target object is one of a plurality of target objects used in generating the first observation data, said plurality of target objects including a first target object and a second target object which are different from each other.

15. A software product comprising a non-transitory machine readable medium including a program of instructions for providing a time certification signature certifying that a set of information existed at an observation time, wherein the program of instructions upon being executed on a computer causes the computer to perform activities comprising:
  acquiring the set of information to be certified;
  acquiring identity data configured to identify the set of information;
  receiving at said computer first observation data associated with the observation time, the first observation data being sent to said computer from a first external server via Internet;
  receiving second observation data sent to said computer, the second observation data being sent from a second external server via the Internet to said computer;
  using the first observation data and the second observation data to generate time certification data for said observation time;
  generating, by the computer, the time certification signature for said observation time by encrypting with an encryption key the observation time, the identity data and the time certification data, wherein the encryption key is configured for use in decrypting the time certification signature for determination of the observation time; and
  attaching the time certification signature to the set of information to certify that the set of information existed at said observation time;
  wherein the first observation data is generated for said observation time from observation of either measurements or image data for a target object that changes without repeatability as time elapses.

16. The software product of claim 15, wherein the encryption key is a public key, and wherein the generating of the time certification data further comprises:

generating hash data from the first observation data using a predetermined first hash function, and using said hash data as the time certification data for said observation time.

17. The software product of claim 15, further comprising: storing the time certification signature with the set of information on the computer.

18. The software product of claim 15, wherein the acquiring of the set of information comprises generating the set of information; and wherein the identity data comprises digest data generated from the set of information to identify the set of information.

19. The software product of claim 15, wherein said server is a web server that obtains said first observation data by applying a second hash function to the image data of the target object; and wherein said target object is selected from a group consisting of a natural waterflow, a broadcast signal, traffic patterns, cloud patterns, and weather observations.

20. The software product of claim 15, wherein the first observation data is sent to said computer from the first external server via a first connection to the Internet, the method further comprising:

detecting at a certification means an instruction from a user to certify that the set of information existed at said observation time, the certification means being connected to said computer by the Internet;

wherein the generating of said time certification data is performed in response to said instruction from the user by the certification means which comprises an observation history recording section for storing the first observation data from the first external server via a second connection the Internet.

* * * * *